N. W. STORER.
MEANS FOR REDUCING COMMUTATOR FLASHING.
APPLICATION FILED NOV. 23, 1917.

Patented Sept. 27, 1921.

WITNESSES:
Olen E. Bee.
D.C. Davis.

INVENTOR
Norman W. Storer.
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC & MANUFACTURING COMPANY, A CORPORATION OF PENNSYLVANIA.

MEANS FOR REDUCING COMMUTATOR-FLASHING.

1,392,086.  Specification of Letters Patent.  Patented Sept. 27, 1921.

Application filed November 23, 1917. Serial No. 203,527.

*To all whom it may concern:*

Be it known that I, NORMAN W. STORER, a citizen of the United States, and a resident of Pittsburgh, in the county of Allegheny and State of Pennsylvania, have invented a new and useful Improvement in Means for Reducing Commutator-Flashing, of which the following is a specification.

My invention relates to means for reducing commutator flashing, and it has for its object to provide apparatus of the character designated which shall be comparatively simple and inexpensive to install and maintain and which shall be highly effective in operation.

Figure 1:
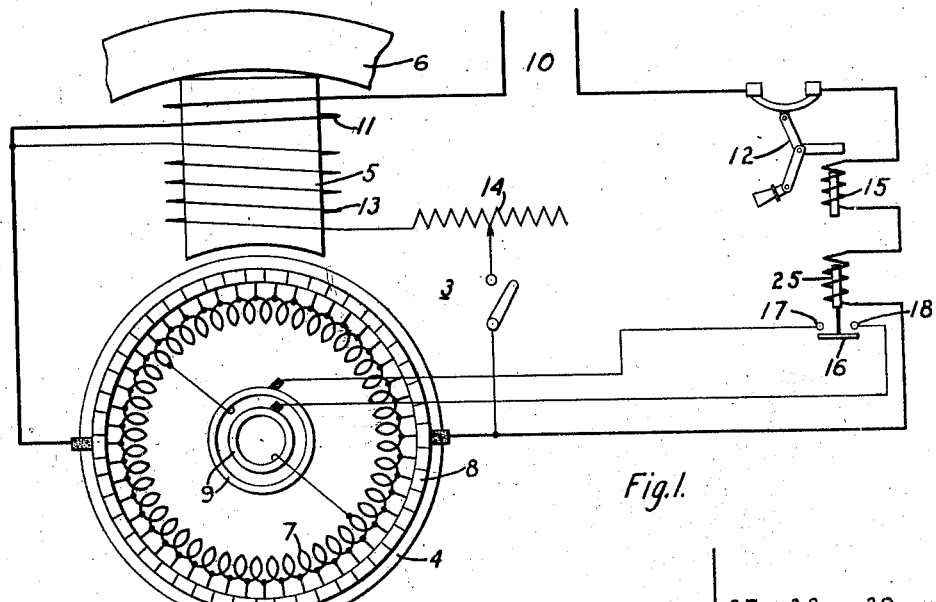
Figure 2:
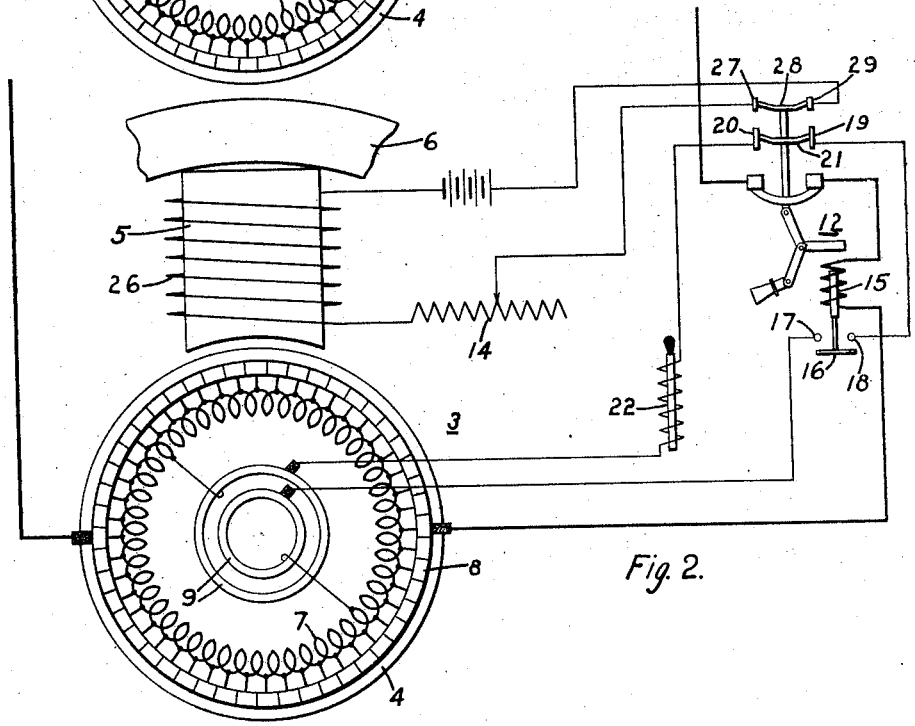

In the accompanying drawing, Figure 1 is a diagrammatic view of a direct-current generator, together with certain auxiliary apparatus and attendant circuits, illustrating one form of my invention; and Fig. 2 is a view similar to Fig. 1 and illustrating a modified form of my invention.

In the operation of direct-current dynamo-electric machines such, for example, as generators, it is well known that the effect of abnormal current flow is to distort the field, giving rise to abnormal rotational electromotive forces in the armature coils undergoing commutation and thus initiating sparking and flashing under the brushes. Said flashes are carried around the commutator cylinder with the rotation of the machine and frequently initiate flash-overs between positive and negative brush sets, particularly in high-voltage generators.

In accordance with the present invention, I provide means whereby, upon the occurrence of abnormal current flow, two or more points of the armature winding, of radically different potential, are interconnected, either directly or through an impedance device. Said impedance device is preferably one embodying a preponderating amount of inductive reactance. By this means, a short-circuit is placed directly on the armature winding which serves to cut down the voltage between adjacent commutator bars and between adjacent brush arms to a value that will not support arcing therebetween.

The reaction of the highly inductive current which flows through the short-circuited armature winding will be such as to substantially neutralize the field and, therefore, the output voltage which is generated by the cutting of this field will be reduced below that value at which flash-overs tend to occur. In other words, the heavy lagging current which flows, by reason either of the inherent reactance of the armature winding itself, or by reason of the inductive device which is placed in circuit therewith, through the armature will generate a flux in such direction as to substantially "kill" the field which is ultimately instrumental in causing the flash-over. Moreover, the output voltage is so reduced by this field suppression that, when the main breaker does operate, the ensuing arc is of relatively low voltage and, therefore, easily extinguished.

The gist of my invention, therefore, resides in the provision of means whereby the field is "killed" in the shortest possible time, and the tendency of flash-over thereby prevented.

In further modifications of my invention, means may be provided whereby, upon the completion of the circuit-opening function by the breaker, the armature interconnection is automatically opened and also means whereby the field circuit is opened.

Referring to the drawing for a more detailed understanding of my invention, I show a direct-current generator diagrammatically at 3 in Fig. 1. Said generator comprises an armature 4 and a field magnet 5, carried by a yoke 6. The armature 4 is provided with a direct-current winding 7 of any desired type, said winding being connected, on the one hand, to a commutator cylinder 8 and having points of radically different potential connected to auxiliary slip rings 9—9, on the other hand. Energy is supplied from the commutator cylinder 8 to a load circuit 10 through a series field winding 11 and a circuit breaker 12, although, in systems subject to overload, the series field winding is preferably omitted because of the sudden increment of field strength upon current rushes. Shunt-type excitation for the pole 5 is provided by a field winding 13 through an adjustable resistor 14.

The direct-current circuit breaker, shown at 12, has an operating plunger 15 of usual form. A quick-acting relay device 25 is arranged to be actuated upon the flow of excess current and to close a circuit between the slip-rings 9—9. Said relay embodies fixed contact members 17 and 18 and a moving contact member 16 coacting therewith.

Having thus described the arrangement of a system embodying my invention, the operation thereof is as follows: Upon the occurrence of abnormal current flow, as by a short-circuit between the mains 10, the relay 25 first operates to close a circuit between the rings 9—9, thus interconnecting the associated points of opposite polarity in the armature winding. During the appreciable time elapsing before the plunger 15 operates the breaker 12 and the breaker arc is extinguished, said interconnection on the armature winding has served to reduce the armature voltage and to suppress the field, as above pointed out, so that the liability to flash-over is greatly reduced.

In the form of my invention shown in Fig. 2, the general arrangement of apparatus is as in Fig. 1 with the following additional features. The contact members 16, 17 and 18 are operated to close the armature short-circuit path by the breaker plunger 15, at the initiation of its travel. The circuit through the contact members 17 and 18 is further closed through contact members 19 and 20 and an associated bridging member 21, said latter members being in contact when the circuit breaker 12 is closed and not separating until said circuit breaker is fully opened. Furthermore, the interconnection between the slip rings 9—9 may be established through an impedance device, such as an inductive reactor 22.

My invention is of particular applicability in connection with high-voltage generators, wherein flashing frequently tends to occur and, with machines of this character, I prefer to employ a separately excited field winding 26. The circuit breaker 12 may further actuate contact members 27, 28 and 29 to open this field circuit prior to the opening of the armature short-circuit at the contact members 19, 20 and 21.

In the operation of the system of Fig. 2, contact is made at the members 16, 17 and 18 at the initiation of abnormal current flow, as before. The inductive reactor 22 limits the current flowing through the armature short-circuit and renders said current of such phase as to more fully suppress the field, as has heretofore been more fully pointed out. In addition, said inductive reactor serves to absorb a portion of the energy, thus reducing the amount available for the production of a flash-over. After the breaker 12 has operated to open the load circuit, the field circuit is opened at the contact members 27, 28 and 29. The bridging member 21 is then withdrawn from the contact members 19 and 20, opening the armature short-circuit and dissipating such energy as may still be inductively interlinked therewith in the form of a small flash.

It is frequently desirable to avoid the complication of the apparatus necessary to automatically open the field circuit and the armature short-circuit, and apparatus may, therefore, be provided to perform these operations manually before again placing the machine in service.

The reactor 22 is unnecessary to the successful operation of the system of Fig. 2 and is employed primarily to cut down the current rush. In many cases, the inherent reactance of the armature is sufficient to perform this function to the desired degree.

While I have shown my invention in two of its preferred forms, it will be obvious to those skilled in the art that it is susceptible of various minor changes and modifications without departing from the spirit thereof and I desire, therefore, that only such limitations shall be placed thereupon as are imposed by the prior art or are specifically set forth in the appended claims.

I claim as my invention:

1. The combination with a dynamo-electric machine of the commutator type, of means for interconnecting a plurality of points of different potential in the armature winding thereof upon the passage of abnormal current therethrough.

2. The combination with a dynamo-electric machine of the commutator type, of an impedance device, and means for interconnecting a plurality of points of different potential in the armature winding thereof through said impedance device upon the passage of abnormal current therethrough.

3. The combination with a dynamo-electric machine of the commutator type, of means for interconnecting a plurality of points of different potential in the armature winding thereof upon the passage of abnormal current therethrough, and means for opening said interconnection upon the cessation of said abnormal current flow.

4. The combination with a dynamo-electric machine of the commutator type, of means for interconnecting a plurality of points of different potential in the armature winding thereof through an impedance device upon the passage of abnormal current therethrough, and means for opening said interconnection upon the cessation of said abnormal current flow.

5. The combination with a dynamo-electric machine of the commutator type, of means for interconnecting a plurality of points of different potential in the armature winding thereof upon the passage of abnormal current therethrough, means for opening the circuit of said machine upon said flow of abnormal current, and means operative by the action of said circuit-opening means to open said interconnection.

6. The combination with a dynamo-electric machine of the commutator type, of means for interconnecting a plurality of points of different potential in the armature winding thereof through an impedance device upon the passage of abnormal current therethrough, means for opening the circuit of said machine upon said flow of abnormal current, and means operative by the action of said circuit-opening means to open said interconnection.

7. The combination with a direct-current generator, of a load circuit connected thereto, and means for interconnecting points of substantially opposite polarity in the armature winding of said generator upon abnormal current flow in said load circuit.

8. The combination with a direct-current generator, of a load circuit connected thereto, and means for interconnecting points of substantially opposite polarity in the armature winding of said generator through an impedance device upon abnormal current flow in said load circuit.

9. The combination with a direct-current generator, of a load circuit connected thereto, auxiliary slip rings upon the armature of said generator and connected to points of differing potential in the armature winding thereof, respectively, a relay device actuated in accordance with the current in said load circuit and means whereby said relay device interconnects said auxiliary slip rings upon the flow of an abnormal amount of current in said load circuit.

10. The combination with a direct-current generator, of a load circuit connected thereto, auxiliary slip rings upon the armature of said generator and connected to points of differing potential in the armature winding thereof, respectively, a relay device actuated in accordance with the current in said load circuit, and means whereby said relay device interconnects said auxiliary slip rings through an impedance device upon the flow of an abnormal amount of current in said load circuit.

11. The combination with a direct-current generator, of a load circuit connected thereto, an overload circuit breaker inserted in said load circuit, and means whereby said circuit breaker, at the outset of its automatic operation upon overload, interconnects at least two points of radically different potential in the armature winding of said generator.

12. The combination with a direct-current generator, of a load circuit connected thereto, an overload circuit breaker inserted in said load circuit, and means whereby said circuit-breaker, at the outset of its automatic operation upon overload, interconnects at least two points of radically different potential in the armature winding of said generator through an impedance device.

13. The combination with a direct-current generator, of a load circuit connected thereto, an overload circuit breaker, inserted in said load circuit, and means whereby said circuit breaker, at the outset of its automatic operation upon overload, interconnects at least two points of radically different potential in the armature winding of said generator, and further means whereby said circuit breaker, at the conclusion of its operation, opens said interconnection.

14. The combination with a direct-current generator, of a load circuit connected thereto, an overload circuit-breaker inserted in said load circuit, and means whereby said circuit-breaker, at the outset of its automatic operation upon overload, interconnects at least two points of radically different potential in the armature winding of said generator through an inductive impedance device, and further means whereby said circuit breaker, at the conclusion of its operation, opens said interconnection.

15. The combination with a dynamo-electric machine of the commutator type, of load responsive means for interconnecting a plurality of points of differing potential in the armature winding thereof through an impedance device, upon the passage of abnormal current therethrough, and for thereafter opening the field circuit of said machine.

16. The combination with a dynamo-electric machine of the commutator type, of means for interconnecting a plurality of points of differing potential in the armature winding thereof upon the passage of abnormal current therethrough, means for then opening the field circuit of said machine, and means for opening said interconnection upon the cessation of said abnormal current flow.

17. The combination with a dynamo-electric machine of the commutator type, of means for interconnecting a plurality of points of differing potential in the armature winding thereof through an impedance device, upon the passage of abnormal current therethrough, means for opening the circuit of said machine upon said flow of abnormal current, and means operative by the action of said circuit-opening means to open the field circuit of said machine.

18. The combination with a dynamo-electric machine of the commutator type, of means for interconnecting a plurality of points of different potential in the armature winding thereof through an impedance device upon the passage of abnormal current therethrough, means for opening the circuit of said machine upon said flow of abnormal current, and means operative by the action of said circuit-opening means to open the field circuit of said machine and then to open said interconnection.

19. The combination with a direct-current generator, of a load circuit connected thereto, an overload circuit-breaker inserted in said load circuit, and means whereby said circuit-breaker, at the outset of its automatic operation upon overload, interconnects at least two points of radically different potential in the armature winding of said generator, and further means whereby said circuit breaker opens the field circuit of said machine.

20. The combination with a direct-current generator, of a load circuit connected thereto, an overload circuit-breaker inserted in said load circuit, and means whereby said circuit-breaker, at the outset of its automatic operation upon overload, interconnects at least two points of radically different potential in the armature winding of said generator, means whereby said circuit-breaker then opens the field circuit of said machine, and further means whereby said circuit-breaker, at the conclusion of its operation, opens said interconnection.

21. The combination with a dynamo-electric machine of the commutator type, of means for interconnecting a plurality of points of different potential in the armature winding thereof upon the passage of abnormal current therethrough, and means for automatically opening said interconnection upon the cessation of said abnormal current flow.

22. The combination with a dynamo-electric machine of the commutator type, of means responsive to flash-producing conditions for automatically interconnecting points of different potential in the armature winding.

23. The combination with a dynamo-electric machine of the commutator type, of means responsive to flash-producing conditions for automatically screening the field flux from the armature conductors undergoing commutation.

24. The combination with a dynamo-electric machine of the commutator type, of means on the armature core for automatically screening the field flux from the armature conductors undergoing commutation upon the occurrence of flash-producing conditions.

25. The combination with a dynamo-electric machine of the commutator type, of means for causing a current of highly inductive character to flow through the armature of said machine thereby suppressing the field and reducing the voltage at the commutator below that value at which flashover occurs.

26. The combination with a dynamo-electric machine of the commutator type, of means for causing a current of highly inductive character to flow through the armature of said machine, upon the occurrence of abnormal load current, and thereafter causing the energy, which tends to promote said flashover, to be dissipated by the action of said inductive current flow.

In testimony whereof I have hereunto subscribed my name this 22nd day of Nov., 1917.

NORMAN W. STORER.